(12) United States Patent
Connor et al.

(10) Patent No.: US 9,453,092 B2
(45) Date of Patent: Sep. 27, 2016

(54) PROCESS FOR CONVERTING A POLYMERIC ESTER TO A POLYMERIC ACID

(75) Inventors: Eric Connor, Los Gatos, CA (US); Faleh Salaymeh, Sunnyvale, CA (US)

(73) Assignee: Relypsa, Inc., Redwood City, CA (US)

( * ) Notice: Subject to any disclaimer, the term of this patent is extended or adjusted under 35 U.S.C. 154(b) by 0 days.

(21) Appl. No.: 14/128,852

(22) PCT Filed: Jun. 27, 2012

(86) PCT No.: PCT/US2012/044404
§ 371 (c)(1),
(2), (4) Date: Feb. 4, 2014

(87) PCT Pub. No.: WO2013/003463
PCT Pub. Date: Jan. 3, 2013

(65) Prior Publication Data
US 2014/0171595 A1    Jun. 19, 2014

Related U.S. Application Data

(60) Provisional application No. 61/501,625, filed on Jun. 27, 2011.

(51) Int. Cl.
| C08F 8/12 | (2006.01) |
| C08F 120/22 | (2006.01) |
| C08F 22/10 | (2006.01) |
| C08F 20/12 | (2006.01) |

(52) U.S. Cl.
CPC .............. *C08F 120/22* (2013.01); *C08F 8/12* (2013.01); *C08F 20/12* (2013.01); *C08F 22/10* (2013.01)

(58) Field of Classification Search
None
See application file for complete search history.

(56) References Cited

U.S. PATENT DOCUMENTS

| | | | |
|---|---|---|---|
| 2,968,674 A | | 1/1961 | Franke et al. |
| 3,513,142 A | | 5/1970 | Blumberg et al. |
| 3,519,589 A | * | 7/1970 | Lyons ............................ 524/555 |
| 3,985,719 A | * | 10/1976 | Hoyt et al. ....................... 525/62 |
| 4,124,748 A | | 11/1978 | Fujimoto et al. |
| 4,200,709 A | * | 4/1980 | Hoyt ................................ 525/62 |
| 4,307,211 A | | 12/1981 | Ito et al. |
| 4,322,511 A | | 3/1982 | Matsuda et al. |
| 5,939,496 A | | 8/1999 | Ungefug et al. |
| 7,429,394 B2 | | 9/2008 | Charmot et al. |
| 7,488,495 B2 | | 2/2009 | Charmot et al. |
| 7,556,799 B2 | | 7/2009 | Charmot et al. |
| 7,776,319 B2 | | 8/2010 | Alpern et al. |
| 7,854,924 B2 | | 12/2010 | Alpern et al. |
| 8,147,873 B2 | | 4/2012 | Charmot et al. |
| 8,192,758 B2 | | 6/2012 | Charmot et al. |
| 8,216,560 B2 | | 7/2012 | Charmot et al. |
| 8,282,913 B2 | | 10/2012 | Charmot et al. |
| 8,282,960 B2 | | 10/2012 | Charmot et al. |
| 8,287,847 B2 | | 10/2012 | Charmot et al. |
| 8,409,561 B2 | | 4/2013 | Charmot et al. |
| 8,445,014 B2 | | 5/2013 | Charmot et al. |
| 8,475,780 B2 | | 7/2013 | Charmot et al. |
| 2005/0220750 A1 | | 10/2005 | Robert et al. |
| 2005/0220751 A1 | | 10/2005 | Charmot et al. |
| 2005/0220752 A1 | | 10/2005 | Charmot et al. |
| 2005/0220889 A1 | | 10/2005 | Charmot et al. |
| 2005/0220890 A1 | | 10/2005 | Charmot et al. |
| 2006/0024265 A1 | | 2/2006 | Alpern et al. |
| 2006/0024336 A1 | | 2/2006 | Charmot et al. |
| 2008/0233073 A1 | | 9/2008 | Charmot et al. |
| 2008/0241092 A1 | | 10/2008 | Charmot et al. |
| 2008/0241093 A1 | | 10/2008 | Charmot et al. |
| 2008/0260679 A1 | | 10/2008 | Charmot et al. |
| 2009/0148533 A1 | | 6/2009 | Charmot et al. |
| 2009/0155370 A1 | | 6/2009 | Cope et al. |
| 2009/0186093 A1 | | 7/2009 | Liu et al. |
| 2010/0104527 A1 | | 4/2010 | Mansky et al. |
| 2010/0111891 A1 | * | 5/2010 | Albrecht et al. ............. 424/78.1 |
| 2010/0111892 A1 | | 5/2010 | Chang et al. |
| 2010/0236340 A1 | | 9/2010 | Lee et al. |
| 2011/0033505 A1 | | 2/2011 | Charmot et al. |
| 2011/0206631 A1 | | 8/2011 | Charmot et al. |
| 2012/0107381 A1 | | 5/2012 | Reddy et al. |
| 2013/0131202 A1 | | 5/2013 | Albrecht et al. |
| 2013/0189216 A1 | | 7/2013 | Albrecht et al. |

FOREIGN PATENT DOCUMENTS

| CN | 101948554 A | 1/2011 |
| WO | 2010/022381 A1 | 2/2010 |
| WO | 2010/022382 A2 | 2/2010 |
| WO | 2012/045253 A1 | 4/2012 |

OTHER PUBLICATIONS

Glavis, F. J., "Hydrolysis of Crystallizable Poly(methyl Methacrylate)," Letters to the Editors, Journal of Polymer Science, 1959, pp. 547-549, vol. XXXVI, Issue 130.
International Search Report and Written Opinion issued for PCT/US2012/044404, dated Aug. 30, 2012, 11 pages.

\* cited by examiner

*Primary Examiner* — Robert C Boyle
(74) *Attorney, Agent, or Firm* — Senniger Powers LLP

(57) ABSTRACT

The present invention generally relates to processes for converting an ester group to an acid group for polymers having a pendant ester of an acid group. This process is generally performed using an aqueous strong base.

19 Claims, No Drawings

PROCESS FOR CONVERTING A POLYMERIC ESTER TO A POLYMERIC ACID

FIELD OF THE INVENTION

The present invention generally relates to processes for converting an ester group to an acid group for polymers having a pendant ester of an acid group. This process is generally performed using an aqueous strong base.

BACKGROUND OF THE INVENTION

It is generally known that hyperkalemia can be treated with various cation exchange polymers including polyfluoroacrylic acid (polyFAA) as disclosed in WO 2005/097081, WO 2010/022381, WO 2010/022382, and WO 2010/022383, each of which is incorporated herein in their entirety by reference.

In the previous methods of manufacturing these polymers, however, longer reaction times under atmospheric air were used. Such processes are not suited to commercial production due to increased costs and the presence of impurities. It has been found that when polymers are hydrolyzed in a bead form, it is difficult to completely hydrolyze the ester groups to acids groups because it is difficult to hydrolyze the ester groups on the inside of the bead.

SUMMARY OF THE INVENTION

The present invention provides a process for converting an ester group of a polymer to an acid group by forming a reaction mixture comprising an aqueous strong base solution and a polymer having a pendant ester of an acid group, wherein the reaction mixture either (i) has a substantially inert atmosphere, (ii) is allowed to react for up to 14 hours, and/or (iii) contains at least 1 kg of a polymer having a pendant ester of an acid group. An additional aspect is where the polymer is in a bead form.

One of the many aspects of the invention is a process for converting an ester group of a polymer to an acid group. The process comprises forming a reaction mixture having a substantially inert atmosphere wherein the reaction mixture comprises an aqueous strong base solution and a polymer having a pendant ester of an acid group which hydrolyzes to produce a polymer comprising the pendant acid group or a salt thereof and an alcohol.

Another aspect is a process for converting an ester group of a polymer to an acid group that comprises forming a reaction mixture, the reaction mixture comprising an aqueous strong base solution and a polymer having a pendant ester of an acid group which hydrolyzes to produce a polymer comprising the pendant acid group or a salt thereof and an alcohol, wherein the reaction mixture is allowed to react for up to 14 hours.

Yet another aspect is a process for converting an ester group of a polymer to an acid group that comprises forming a reaction mixture, the reaction mixture comprising an aqueous strong base solution and at least 1 kg of a polymer having a pendant ester of an acid group which hydrolyzes to produce a polymer comprising the pendant acid group or a salt thereof and an alcohol.

DESCRIPTION OF THE PREFERRED EMBODIMENTS

Polymers having a pendant ester group can be more difficult to convert to acid groups by hydrolysis with an aqueous base because of the steric effects of the ester group being attached to a polymer backbone. The polymer having a pendant ester group is in the form of a bead and the ester groups attached to the polymer on the inside of the bead are more difficult to convert to acid groups than the ester groups on the outside of the bead. Further, the process described herein provides an improved way to control the cation exchange capacity of the product polymer having a pendant acid group by closely controlling the conversion of the polymer having a pendant ester of an acid group to the polymer having a pendant acid group.

Further, it has been discovered that the presence of oxygen in the reaction can cause impurities in the polymer having an acid group upon hydrolysis of the polymer having a pendant ester of an acid group. It has also been found that a relatively long reaction time along with exposure to high temperatures can also result in more impurities in the polymer having an acid group. When the hydrolysis reaction is performed as a larger scale reaction, more impurities resulted in the product polymer. The presence of impurities can be minimized in the resulting polymer, even when the polymer is produced in kilogram scale quantities, by performing the hydrolysis reaction with an aqueous strong base solution in a substantially oxygen-free (e.g., inert) atmosphere and/or by decreasing the reaction time. The hydrolysis process described herein provides a polymer having a pendant acid group that has a more consistent color and minimizes the color differences between polymer lots.

The polymer having a pendant ester group can undergo a reaction with an aqueous strong base where the ester group is converted to an acid group and an alcohol is produced. Generally this reaction is described as follows:

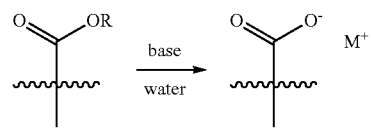

wherein R is a hydrocarbyl group such as alkyl and M is a monovalent cation. $M^+$ can be selected from the group of $H^+$, $Li^+$, $Na^+$, $K^+$, $Rb^+$, $Cs^+$, $Ca^{2-}$, $Sr^{2+}$, $Ba^{2+}$, or a combination thereof. In various preferred reactions, $M^+$ is $H^+$, $Ca^{2-}$, or a combination thereof. The reaction occurs on the pendant ester group that is attached to the polymer; the polymer attachment occurs at the wavy bond.

The polymer having a pendant ester group can be a hydrophobic polymer. This hydrophobic polymer tends to repel, not combine with, or not dissolve in water. Thus, since the aqueous base solution contains water, the hydrolysis of hydrophobic polymers is more difficult due to this tendency to repel, not combine with, or not dissolve in water.

The acid group can be a carboxylic acid group, a phosphonic acid group, a phosphoric acid group, a sulfonic acid group, a sulfuric acid group, a sulfamic acid group, or a salt thereof. Preferably, the acid group is a carboxylic acid group.

The hydrophobic polymer having a pendant ester of an acid group comprises a methyl ester of poly-α-fluoroacrylic acid. Preferably, the methyl ester of poly-α-fluoroacrylic acid is crosslinked with a crosslinking monomer.

When the methyl ester of poly-α-fluoroacrylic acid is crosslinked with a crosslinking monomer, the crosslinking monomer is preferably divinyl benzene, 1,7-octadiene, or a combination thereof.

The crosslinked hydrophobic polymer having a pendant ester of an acid group can comprise structural units corresponding to Formulae 1 and 2, Formulae 1 and 3, or Formulae 1, 2, and 3, wherein Formula 1, Formula 2, and Formula 3 are represented by the following structures:

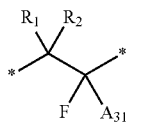

Formula 1

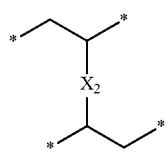

Formula 2

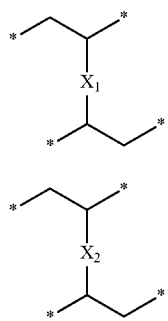

Formula 3 wherein $R_1$ and $R_2$ are each independently hydrogen, alkyl, cycloalkyl, or aryl; $A_{31}$ is an ester of a carboxylic, phosphonic, or phosphoric group; $X_1$ is arylene; and $X_2$ is alkylene, an ether moiety, or an amide moiety.

In some of the preferred embodiments, the crosslinked hydrophobic polymer is represented by Formulae 1A, 2A, and 3A:

Formula 1A

Formula 2A

Formula 3A

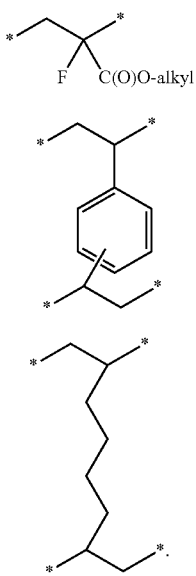

The polymer having a pendant ester of an acid group can comprise a reaction product of a polymerization mixture comprising monomers of either (i) Formulae 11 and 22, (ii) Formulae 11 and 33, or (iii) Formulae 11, 22, and 33, wherein Formula 11, Formula 22, and Formula 33 are represented by the following structures:

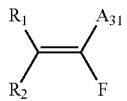

Formula 11

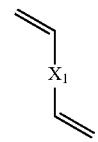

Formula 22

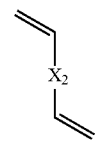

Formula 33 and wherein $R_1$ and $R_2$ are each independently hydrogen, alkyl, cycloalkyl, or aryl; $A_{31}$ is an ester of a carboxylic, phosphonic, or phosphoric acid group; $X_1$ is arylene; and $X_2$ is alkylene, an ether moiety, or an amide moiety.

A preferred polymer can comprise a reaction product of a polymerization mixture comprising monomers of Formulae 11A, 22A, and 33A:

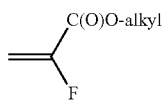

Formula 11A

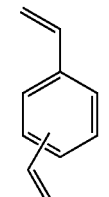

Formula 22A

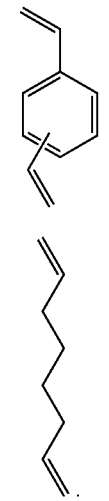

Formula 33A

The alkyl group of the ester comprises methyl, ethyl, n-propyl, isopropyl, n-butyl, isobutyl, tert-butyl, sec-butyl, n-pentyl, 2-pentyl, 3-pentyl, 2-methyl-1-butyl, 3-methyl-1-butyl, 3-methyl-2-butyl, 2,2-dimethyl-1-propyl, 1,1-dimethyl-1-propyl, n-hexyl, 2-hexyl, 3-hexyl, 2-methyl-1-pentyl, 2-methyl-2-pentyl, 2-methyl-3-pentyl, 3-methyl-1-pentyl, 3-methyl-2-pentyl, 3-methyl-3-pentyl, 4-methyl-1-pentyl, 4-methyl-2-pentyl, 2,2-dimethyl-1-butyl, 2,3-dimethyl-1-butyl, 3,3-dimethyl-1-butyl, 3,3-dimethyl-2-butyl, 2,3-dimethyl-2-butyl, or 2-ethyl-1-butyl ester. Preferably, the alkyl group of the ester is methyl.

For the process of this invention, the reaction mixture can be an aqueous suspension comprising the polymer having a pendant ester of an acid group and an aqueous base solution. In this aqueous suspension, the solids content of the polymer having a pendant ester of an acid group is from about 15 wt. % to about 30 wt. %; preferably, 20 wt. % to about 30 wt. %; more preferably, 20 wt. % based on the total amount of polymer in the suspension.

The product polymer comprising an acid group or a salt thereof can comprise structural units corresponding to Formulae 15 and 25, Formulae 15 and 35, or Formulae 15, 25, and 35, wherein Formula 15, Formula 25, and Formula 35 are represented by the following structures:

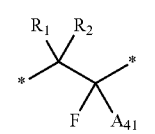

Formula 15

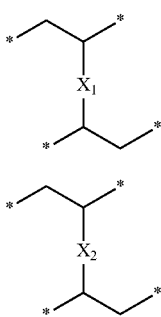

Formula 25

Formula 35 wherein $R_1$ and $R_2$ are each independently hydrogen, alkyl, cycloalkyl, or aryl; $A_{41}$ is a carboxylic, phosphonic, or phosphoric group; $X_1$ is arylene; and $X_2$ is alkylene, an ether moiety, or an amide moiety.

Preferably, the product polymer having an acid group is represented by structural units corresponding to Formulae 15A, 25A, and 35A:

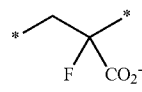

Formula 15A

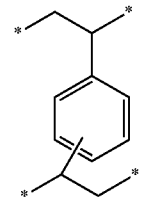

Formula 25A

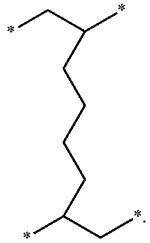

Formula 35A

As described above, the polymer having a pendant ester of an acid group is reacted with an aqueous strong base to form the polymer having a pendant acid group. The aqueous strong base can be lithium hydroxide, sodium hydroxide, potassium hydroxide, rubidium hydroxide, cesium hydroxide, calcium hydroxide, strontium hydroxide, barium hydroxide, or a combination thereof. Preferably, the aqueous strong base is sodium hydroxide, potassium hydroxide, or a combination thereof; more preferably, the aqueous strong base comprises sodium hydroxide.

The concentration of the aqueous strong base solution can range from about 15 wt. % to 50 wt. %; preferably, 20 wt. % to about 30 wt. %. More preferably, the concentration of the aqueous strong base solution is about 25 wt. %. The concentration of the aqueous strong base solution can also be expressed in units of mole percent; for example, the concentration of the aqueous strong base solution can range from about 10 mole % to about 20 mole %. Preferably, the concentration of the aqueous strong base solution is about 15 mole %.

The molar ratio of the strong base solution to the polymer having a pendant ester of an acid group is from about 0.8 to about 1.5; preferably, the ratio is about 1.22.

There are various methods for determining the molar ratio of the strong base to the polymer having a pendant ester of an acid group. In the first method, the strong base (e.g., NaOH) molar equivalent is calculated by only considering the amount of polymer having a pendant ester of an acid group (e.g., methyl ester of poly-α-fluoroacrylate). This calculation results in a molar ratio of NaOH to methyl ester of poly-α-fluoroacrylate of 1.22. The second method calculates the molar ratio of base (e.g., NaOH) by assuming the starting polymer composition is the same as the amount of the monomer having a pendant ester of an acid group (e.g., methyl ester of poly-α-fluoroacrylate) that was added to the polymerization reaction mixture to make the polymer having a pendant ester of an acid group. Since the α-fluoroacrylate, methyl ester comprises 89 wt. % of the reaction mixture, the molar ratio of NaOH to methyl ester of poly-α-fluoroacrylate is 1.086:1.

The strong base solution can further comprise alcohol. The alcohol can be methanol, ethanol, propanol, or a combination thereof; preferably, the alcohol comprises methanol.

The concentration of the alcohol in the aqueous base solution can be from about 5 wt. % to about 25 wt. %. of the total base solution mass; preferably, the alcohol concentration can be about 10 wt. %.

The reaction solution can further comprise alcohol. The alcohol can be methanol, ethanol, propanol, or a combination thereof; preferably, the alcohol comprises methanol.

The concentration of the alcohol in the aqueous reaction solution can be from 5 wt. % to about 15 wt. % based on the final total reaction mass after the addition of base solution; preferably, the alcohol concentration can be about 7 wt. %.

The atmosphere of the reaction mixture can be a substantially oxygen-free or inert atmosphere. The substantially inert atmosphere has a concentration of oxygen of less than about 5 ppm. The substantially inert atmosphere of the reaction mixture is provided by purging the aqueous base solution with an inert gas before adding it to the reaction mixture. The polymer suspension can also be purged with an inert gas before the aqueous base solution is added to the polymer suspension. The inert gas can be helium, neon, nitrogen, argon, krypton, xenon, or a combination thereof; preferably, the inert gas is nitrogen, argon, or a combination thereof.

The reaction time can be up to about 2, 3, 4, 5, 6, 7, 8, 9, 10, 11, 12, 13 or 14 hours. In preferred processes, the reaction time can be up to 5 hours. The reaction time can be optimized by measuring the concentration of sodium ion in the beads and the amount of sodium ion consumed per gram of polymer in the reaction mixture.

The reaction mixture can contain at least about 1 kg, at least about 5 kg, at least about 10 kg, or more of the polymer having a pendant ester of an acid group.

The reaction temperature can range from about 55° C. to reflux temperature (e.g., 85° C.); preferably, from about 80° C. to about 85° C. The reaction mixture can be heated to about 83° C. and the aqueous strong base can be added over from about 1 hour to about 3 hours; preferably, over about 2 hours. Once the addition of the aqueous strong base is complete, the reaction mixture is heated for at least 2 additional hours at from about 80° C. to about 85° C.; preferably, at about 83° C. The reaction mixture can be heated for at least 3, at least 4, or at least 5 additional hours. The reaction mixture can be cooled to about 60° C. and if the concentration of sodium ion in the liquid part of the reaction mixture is less than or equal to 3 wt. %, the reaction is complete. Alternatively, if the reaction mixture has a sodium ion concentration of greater than 3 wt. %, the reaction mixture is heated to about 80° C. to about 85° C. and held at that temperature for an additional hour and then cooled to about 60° C. and the concentration of sodium ion in the liquid part of the reaction mixture is determined to be less than or equal to 3 wt. % or the difference between the two titrations values is less than or equal to 0.5 wt. %, the reaction is complete.

The reaction temperature can range from about 55° C. to reflux temperature (e.g., 85° C.); preferably, about 85° C. The reaction mixture can be heated to about 85° C. and the aqueous strong base can be added over from about 1 hour to about 3 hours; preferably, over about 2 hours. Once the addition of the aqueous strong base is complete, the reaction mixture is heated for at least 30 additional minutes at about 85° C. The reaction mixture can be heated for at least 30 additional minutes or at least 1, at least 2, at least 3, at least 4, or at least 5 additional hours. The reaction mixture can be cooled to about 60° C. and if the concentration of sodium ion in the liquid part of the reaction mixture is less than or equal to 3 wt. %, the reaction is complete. Alternatively, if the reaction mixture has a sodium ion concentration of greater than 3 wt. %, the reaction mixture is heated to about 85° C. and held at that temperature for an additional hour and then cooled to about 60° C. and the concentration of sodium ion in the liquid part of the reaction mixture is determined to be less than or equal to 3 wt. % or the difference between the two titrations values is less than or equal to 0.5 wt. %, the reaction is complete.

The hydrolysis reaction can be monitored to determine when a desired conversion has been reached, including substantially complete conversion. An in-process control allows for the control of reaction parameters, including reaction time and temperature, to control conversion. For example, the hydrolysis reaction can be monitored by sampling an aliquot from the reaction mixture and titrating it against 0.05M hydrochloric acid. If two consecutive titration values have a difference less than 0.55 wt. %, preferably, less than 0.5 wt. %, it may be taken as an indication that the consumption of base in the reaction mixture reached a plateau and the concentration of the base remains constant. Also, it may be an indication that substantially all of the methyl ester groups in the polymer have been converted to carboxylate groups. The reaction time needed for the concentration of the base to reach a constant value can be used as an indication of having reached the end point of the hydrolysis reaction.

When the solid polymer content of the hydrolysis reaction is from about 18 wt. % to about 22 wt. %, preferably, 20 wt. %, the reaction mixture is titrated with hydrochloric acid and the reaction is considered complete when the base concentration is less than or equal to about 4 wt. %, preferably, 3 wt. %.

When the polymer solid content of the hydrolysis reaction is from about 28 wt. % to about 32 wt. %, preferably, 30 wt. %, the reaction mixture is titrated with hydrochloric acid and the reaction is considered complete when the base concentration is less than or equal to about 6 wt. %, preferably, 5 wt. %.

When the solid content of the hydrolysis reaction is from about 24 wt. % to about 28 wt. %, preferably, 24 wt. %, the reaction mixture is titrated with hydrochloric acid and the reaction is considered complete when the base concentration is less than or equal to about 5 wt. %, preferably 4.5 wt. %.

The hydrolysis reaction can also be monitored by sampling a small portion of the polymer, washing it with excess amount of water to remove the residual base, and extracting it with weak hydrochloric acid. The extracted solution will contain the corresponding cation from the base bound to the polymer. The cation concentration in the extract is analyzed by ion chromatography and calculated against the sample weight. The calculated cation weight concentration is a direct measurement of the degree of the progress of the hydrolysis reaction. The theoretical calculation of cation bound to fully hydrolyzed polymer is equal to about 16 wt. % to about 19 wt. %, preferably, 19 wt. %, of total polymer weight.

The polymers having a pendant ester group used in the invention are in the form of substantially spherical particles (i.e., beads or bead form). As used herein, the term "substantially" means generally rounded particles having an average aspect ratio of about 1.0 to about 2.0. Aspect ratio is the ratio of the largest linear dimension of a particle to the smallest linear dimension of the particle. Aspect ratios may be easily determined by those of ordinary skill in the art. This definition includes spherical particles, which by definition have an aspect ratio of 1.0. In some embodiments, the particles have an average aspect ratio of about 1.0, 1.2, 1.4, 1.6, 1.8 or 2.0. The particles may be round or elliptical when observed at a magnification wherein the field of view is at least twice the diameter of the particle.

The polymer particles have a mean diameter of from about 20 μm to about 200 μm. Specific ranges are where the polymer particles have a mean diameter of from about 20 μm to about 200 μm, from about 20 μm to about 150 μm, or from about 20 μm to about 125 μm. Other ranges include from about 35 υm to about 150 μm, from about 35 μm to about 125 μm, or from about 50 μm to about 125 μm. Particle sizes, including mean diameters, distributions, etc. can be determined using techniques known to those of skill in the art. For example, U.S. Pharmacopeia (USP) <429> discloses methods for determining particle sizes.

The polymer particles can also have less than about 4 volume percent of the particles that have a diameter of less than about 10 μm; particularly, less than about 2 volume percent of the particles that have a diameter of less than about 10 μm; more particularly, less than about 1 volume percent of the particles that have a diameter of less than about 10 μm; and even more particularly, less than about 0.5 volume percent of the particles that have a diameter of less than about 10 μm. Specific ranges for particle size can be less than about 4 volume percent of the particles that have a diameter of less than about 20 µm; less than about 2 volume percent of the particles that have a diameter of less than about 20 µm; less than about 1 volume percent of the particles that have a diameter of less than about 20 µm; less than about 0.5 volume percent of the particles that have a diameter of less than about 20 µm; less than about 2 volume percent of the particles that have a diameter of less than about 30 µm; less than about 1 volume percent of the particles that have a diameter of less than about 30 µm; less than about 0.5 volume percent of the particles that have a diameter of less than about 30 µm; less than about 2 volume percent of the particles that have a diameter of less than about 40 µm; less than about 1 volume percent of the particles that have a diameter of less than about 40 µm; or less than about 0.5 volume percent of the particles that have a diameter of less than about 40 µm.

The polymer having a pendant ester group can have a particle size distribution wherein not more than about 5 volume % of the particles have a diameter less than about 30 µm (i.e., D(0.05)<30 µm), not more than about 5 volume % of the particles have a diameter greater than about 250 µm (i.e., D(0.05)>250 µm), and at least about 50 volume % of the particles have a diameter in the range from about 70 to about 150 µm.

The particle distribution of the polymer can be described as the span. The span of the particle distribution is defined as (D(0.9)−D(0.1))/D(0.5), where D(0.9) is the value wherein 90% of the particles have a diameter below that value, D(0.1) is the value wherein 10% of the particles have a diameter below that value, and D(0.5) is the value wherein 50% of the particles have a diameter above that value and 50% of the particles have a diameter below that value as measured by laser diffraction. The span of the particle distribution is typically from about 0.5 to about 1, from about 0.5 to about 0.95, from about 0.5 to about 0.90, or from about 0.5 to about 0.85. Particle size distributions can be measured using Niro Method No. A 8 d (revised September 2005), available from GEA Niro, Denmark, using the Malvern Mastersizer.

The polymer having a pendant ester of an acid group can be synthesized in a suspension polymerization reaction by preparing an organic phase and an aqueous phase. The organic phase typically contains a monomer of Formula 11, a monomer of Formula 22, a monomer of Formula 33, and a polymerization initiator. The aqueous phase contains a suspension stabilizer, a water soluble salt, water, and optionally a buffer. The organic phase and the aqueous phase are then combined and stirred under nitrogen. The mixture is generally heated to about 60° C. to about 80° C. for about 2.5 to about 3.5 hours, allowed to rise up to 95° C. after polymerization is initiated, and then cooled to room temperature. After cooling, the aqueous phase is removed. Water is added to the mixture, the mixture is stirred, and the resulting solid is filtered. The solid is washed with water, alcohol or alcohol/water mixtures.

Polymerization suspension stabilizers, such as polyvinyl alcohol, can be used to prevent coalescence of particles during the polymerization process. Further, it has been observed that the addition of sodium chloride in the aqueous phase decreased coalescence and particle aggregation. Other suitable salts for this purpose include salts that are soluble in the aqueous phase. Preferably, these water soluble salts are added at a concentration of from about 0.1 wt. % to about 10 wt. %, particularly from about 2 wt. % to about 5 wt. % and even more particularly from about 3 wt. % to about 4 wt. %.

Preferably, an organic phase of methyl 2-fluoroacrylate (90 wt. %), 1,7-octadiene (5 wt. %) and divinylbenzene (5 wt. %) is prepared and 0.5 wt. % of lauroyl peroxide is added to initiate the polymerization reaction. Additionally, an aqueous phase of water, polyvinyl alcohol, phosphates, sodium chloride, and sodium nitrite is prepared. Under nitrogen and while keeping the temperature below about 30° C., the aqueous and organic phases are mixed together. Once mixed completely, the reaction mixture is gradually heated with continuous stirring. After the polymerization reaction is initiated, the temperature of the reaction mixture is allowed to rise up to about 95° C. Once the polymerization reaction is complete, the reaction mixture is cooled to room temperature and the aqueous phase is removed. The solid can be isolated by filtration after water is added to the mixture. The resulting product is a crosslinked (methyl 2-fluoroacrylate)-divinylbenzene-1,7-octadiene terpolymer.

Having described the invention in detail, it will be apparent that modifications and variations are possible without departing from the scope of the invention defined in the appended claims.

EXAMPLES

The following non-limiting examples are provided to further illustrate the present invention.

Hydrolysis Procedure 1

Hydrolysis of cross-linked methylfluoroacrylate polymer (Sample 1-Me) was done in library format. Cross linked methylfluoroacrylate polymer (Sample 1-Me) was prepared by polymerization of methyl 2-fluoroacrylate with 1,7-octadiene and divinylbenzene, as disclosed in U.S. Ser. No. 12/545,810 (published as US Patent Application Publication No. 2010/0111891), for example as in Example 8, Part A up to the hydrolysis step in paragraph [0133]. U.S. Patent Application Publication No. 2010/0111891 is incorporated herein by reference for all purposes. Sample 1-Me (1.3 g, 11.1 mmole) was charged into 8 mL vials. Solvent water (3.5 g) and sodium hydroxide (NaOH, 2.1 g, 13.6 mmole, 25 wt. % in water) were dispensed using automated liquid dispensing robots. Vials were placed in a Biotage reactor (Endeavor series) and sealed. The reaction mixture was stirred with an overhead stirrer and purged with inert gas for 15 minutes prior to heating to 83° C. for a particular reaction time. Samples were then collected by parallel filtration. The supernatant solution from individual reaction was collected and the filter cake was washed with distilled water until all the residual base was washed away. The supernatant solution was titrated against 0.05 M hydrochloric acid to measure the residual sodium hydroxide left in the reaction mixture. A titration weight percent value of less than 3 wt. % sodium hydroxide was an indication of complete hydrolysis. The hydrolyzed polymer was extracted with acidic solution to measure the amount of sodium ($Na^-$) incorporated in the polymer as a measure of degree of complete hydrolysis. A measurement of 17-18 wt. % of $Na^+$ in the polymer was indicative of complete hydrolysis. The samples 2-A1 to 2-A8 report the results of these experiments.

Hydrolysis Procedure 2

Hydrolysis of methylfluoroacrylate polymer (Sample 1-Me) was done in library format. Methylfluoroacrylate polymer (Sample 1-Me) (1.3 g, 11.1 mmole) was charged into 8 mL vials. Solvent water (3.0 g), methanol (0.51 g, d: 0.791) and sodium hydroxide (NaOH, 2.1 g, 13.6 mmole, 25 wt. % in water) were dispensed using automated liquid dispensing robots. Vials were placed in a Biotage reactor (Endeavor series) and sealed. The reaction mixture was stirred with an overhead stirrer and purged with inert gas for 15 minutes prior to heating to 83° C. for a particular reaction time. Samples were then collected by parallel filtration. The supernatant solution from individual reaction was collected and the filter cake was washed with distilled water until all the residual base was washed away. The supernatant solution was titrated against 0.05 M hydrochloric acid (HCl) to measure the residual sodium hydroxide left in the reaction mixture. A titration weight percent value of less than 3 wt. % sodium hydroxide was an indication of complete hydrolysis. The hydrolyzed polymer was extracted with acidic solution to measure the amount of sodium ($Na^+$) incorporated in the polymer as a measure of degree of complete hydrolysis. A measurement of 17-18 wt. % of $Na^+$ in the polymer was indicative of complete hydrolysis. The samples 3-A1 to 3-A8 report the results of these experiments.

Hydrolysis Procedure 3

Hydrolysis of methylfluoroacrylate polymer (Sample 1-Me) was done in library format. Methylfluoroacrylate polymer (Sample 1-Me) (1.3 g, 11.1 mmole) was charged into 8 mL vials. Solvent water (2.2 g), methanol (0.30 g, d: 0.791) and sodium hydroxide (NaOH, 1.1 g, 13.6 mmole, 50 wt. % in water) were dispensed using automated liquid dispensing robots. Vials were placed in a Biotage reactor (Endeavor series) and sealed. The reaction mixture was stirred with an overhead stirrer and purged with inert gas for 15 minutes prior to heating to 83° C. for a particular reaction time. Samples were then collected by parallel filtration. The supernatant solution from individual reaction was collected and the filter cake was washed with distilled water until all the residual base was washed away. The supernatant solution was titrated against 0.05 M hydrochloric acid (HCl) to measure the residual NaOH left in the reaction mixture. A titration weight percent value of less than 5 wt. % sodium hydroxide was an indication of complete hydrolysis. The hydrolyzed polymer was extracted with acidic solution to measure the amount of sodium ($Na^+$) incorporated in the polymer as a measure of degree of complete hydrolysis. A measurement of 17-18 wt. % of $Na^+$ in the polymer was indicative of complete hydrolysis. The samples 4-A1 to 4-A8 report the results of these experiments.

Hydrolysis Procedure 4

Hydrolysis of methylfluoroacrylate polymer (Sample 1-Me) was done in library format. Methylfluoroacrylate polymer (Sample 1-Me) (1.3 g, 11.1 mmole) was charged into 8 mL vials. Solvent water (3.0 g), methanol (0.51 g, d: 0.791) and sodium hydroxide (NaOH, 2.1 g, 13.6 mmole, 25 wt. % in water) were dispensed using automated liquid dispensing robots. Vials were placed in a Biotage reactor (Endeavor series) and sealed. The reaction mixture was stirred with an overhead stirrer and purged with inert gas for 15 minutes prior to heating. Vials in this library were heated to a different temperature (from 60° C. to 90° C.) for a particular reaction time. Samples were then collected by parallel filtration. The supernatant solution from individual reactions was collected and the filter cake was washed with distilled water until all the residual base was washed away. The supernatant solution was titrated against 0.05 M hydrochloric acid (HCl) to measure the residual sodium hydroxide left in the reaction mixture. A titration weight percent value of less than 3 wt. % sodium hydroxide was an indication of complete hydrolysis. The hydrolyzed polymer was extracted with acidic solution to measure the amount of sodium ($Na^+$) incorporated in the polymer as a measure of degree of complete hydrolysis. A measurement of 17-18 wt. % of $Na^+$ in the polymer was indicative of complete hydrolysis. The samples 5-A1 to 5-A8 report the results of these experiments.

| Sample | 1-Me (g) | Solvent Water (g) | Co-Solvent MeOH (g) | NaOH 25 wt. % soln (g) | NaOH 50 wt. % soln (g) | Reaction time (h) | Reaction temperature (° C.) | NaOH wt. % in the Supernatant | $Na^+$ wt % in polymer after hydrolysis |
|---|---|---|---|---|---|---|---|---|---|
| 2-A1 | 1.3 | 3.5 | 0 | 2.1 | | 5 | 83 | 7.62 | 8.35 |
| 2-A2 | 1.3 | 3.5 | 0 | 2.1 | | 7 | 83 | 5.77 | 11.88 |
| 2-A3 | 1.3 | 3.5 | 0 | 2.1 | | 9 | 83 | 4.18 | 16.16 |
| 2-A4 | 1.3 | 3.5 | 0 | 2.1 | | 11 | 83 | 3.29 | 16.63 |
| 2-A5 | 1.3 | 3.5 | 0 | 2.1 | | 13 | 83 | 2.75 | 17.93 |
| 2-A6 | 1.3 | 3.5 | 0 | 2.1 | | 15 | 83 | 2.66 | 17.83 |
| 2-A7 | 1.3 | 3.5 | 0 | 2.1 | | 17 | 83 | 2.45 | 17.56 |
| 2-A8 | 1.3 | 3.5 | 0 | 2.1 | | 20 | 83 | 2.64 | 17.57 |
| 3-A1 | 1.3 | 3.0 | 0.51 | 2.1 | | 1 | 83 | 6.88 | 8.56 |
| 3-A2 | 1.3 | 3.0 | 0.51 | 2.1 | | 2 | 83 | 2.89 | 16.72 |
| 3-A3 | 1.3 | 3.0 | 0.51 | 2.1 | | 3 | 83 | 3.01 | 16.87 |
| 3-A4 | 1.3 | 3.0 | 0.51 | 2.1 | | 4 | 83 | 2.63 | 17.22 |
| 3-A5 | 1.3 | 3.0 | 0.51 | 2.1 | | 5 | 83 | 2.53 | 17.12 |
| 3-A6 | 1.3 | 3.0 | 0.51 | 2.1 | | 6 | 83 | 2.40 | 17.12 |
| 3-A7 | 1.3 | 3.0 | 0.51 | 2.1 | | 7 | 83 | 2.62 | 17.43 |
| 3-A8 | 1.3 | 3.0 | 0.51 | 2.1 | | 8 | 83 | 2.45 | 17.4 |
| 4-A1 | 1.3 | 2.2 | 0.30 | | 1.1 | 1 | 83 | 12.024 | 7.26 |
| 4-A2 | 1.3 | 2.2 | 0.30 | | 1.1 | 2 | 83 | 5.278 | 16.77 |
| 4-A3 | 1.3 | 2.2 | 0.30 | | 1.1 | 3 | 83 | 4.956 | 16.92 |
| 4-A4 | 1.3 | 2.2 | 0.30 | | 1.1 | 4 | 83 | 4.627 | 17.19 |
| 4-A5 | 1.3 | 2.2 | 0.30 | | 1.1 | 5 | 83 | 4.31 | 17.18 |
| 4-A6 | 1.3 | 2.2 | 0.30 | | 1.1 | 6 | 83 | 4.452 | 17.50 |
| 4-A7 | 1.3 | 2.2 | 0.30 | | 1.1 | 7 | 83 | 4.202 | 17.53 |
| 4-A8 | 1.3 | 2.2 | 0.30 | | 1.1 | 8 | 83 | 4.353 | 17.24 |
| 5-A1 | 1.3 | 3.0 | 0.51 | 2.1 | | 8 | 60 | 8.99 | 2.48 |
| 5-A2 | 1.3 | 3.0 | 0.51 | 2.1 | | 8 | 65 | 8.48 | 3.50 |
| 5-A3 | 1.3 | 3.0 | 0.51 | 2.1 | | 8 | 70 | 7.79 | 5.43 |
| 5-A4 | 1.3 | 3.0 | 0.51 | 2.1 | | 8 | 75 | 4.85 | 12.58 |
| 5-A5 | 1.3 | 3.0 | 0.51 | 2.1 | | 8 | 80 | 2.68 | 17.18 |
| 5-A6 | 1.3 | 3.0 | 0.51 | 2.1 | | 8 | 85 | 2.35 | 17.52 |
| 5-A7 | 1.3 | 3.0 | 0.51 | 2.1 | | 14 | 75 | 5.06 | 12.09 |
| 5-A8 | 1.3 | 3.0 | 0.51 | 2.1 | | 20 | 75 | 4.54 | 13.62 |

Hydrolysis Procedure 5

To a reactor equipped with an overhead stirrer and condenser, 20 kg of Sample 1-Me polymer in methyl ester form was charged. Methanol (7.91 kg) and water (46.3 kg) were then added to the Sample 1-Me sample. The resulting mixture was stirred at 180 rpm and purged with nitrogen gas for 30-45 minutes prior to heating. The reaction assembly was heated to 83° C. under a nitrogen blanket. When the temperature of the reaction mixture reached 83° C., sodium hydroxide (NaOH, 26.53 L, 0.208 moles, 25 wt. % in water, d, 1.26) was added slowly over a 2 hour period. The molar ratio of the base to the methyl ester monomer in the Sample 1-Me polymer was 1.22. The heating continued after the addition of sodium hydroxide solution for an additional 2.5 hours. Thus, the total heating time was 4.5 hours, the reactor was subsequently cooled to 60° C. in 2 hours, to reach the first in process control (IPC) point.

The reaction end point was determined by sampling a 200 μl aliquot from the reaction mixture at the 4.5 hour mark and 60 minutes thereafter. The extracted sample passed through 1.0 μm filter disc and then was titrated against 0.05 M HCl solution. The sodium hydroxide content in the supernatant as determined by titration was found to be below 3 wt. % (measured 2.6 wt. %). When two successive samples were within 0.5 wt. % in sodium ion content from each other the reaction was determined to be complete.

The reaction mixture was allowed to cool down to ambient temperature and the hydrolyzed product was collected by filtration. The filtered cake was washed with distilled water until the pH was 7. The filtered cake was lyophilized for 48 hours.

Hydrolysis Procedure 6

To a reactor equipped with an overhead stirrer and condenser, 20 g of Sample 1-Me polymer in methyl ester form was charged. Methanol (4.56 g) and water (32.69 g) were then added to the Sample 1-Me sample. The resulting mixture was stirred at 180 rpm and purged with nitrogen gas for 30-45 minutes prior to heating. The reaction assembly was heated to 83° C. under a nitrogen blanket. When the temperature of the reaction mixture reached 83° C., sodium hydroxide (NaOH, 11.03 L, 0.208 mmoles, 50 wt. %, d, 1.51) was added slowly over a 2 hour period. The molar ratio of base to the methyl ester monomer in the 1-Me polymer was 1.22. The heating continued after the addition of sodium hydroxide solution for an additional 2.5 hours. Thus, the total heating time was 4.5 hours. The reactor was subsequently cooled to 60° C. in 2 hours, to reach the first IPC point.

The reaction end point was determined by sampling 200 μl aliquot from the reaction mixture at the 4.5 hour mark and 60 minutes thereafter. The extracted sample passed through 1.0 μm filter disc and then was titrated against 0.05 M HCl solution. The sodium hydroxide content in the supernatant as determined by titration was found to be below 5 wt. % (measured 4.65 wt. %). When two successive samples were within 0.5 wt. % in sodium ion content from each other the reaction was determined to be complete.

The reaction mixture was allowed to cool down to ambient temperature and the hydrolyzed product was collected by filtration. The filter cake was washed with distilled water until the pH was 7. The filter cake was lyophilized for 48 hours.

In view of the above, it will be seen that the several objects of the invention are achieved and other advantageous results attained.

As various changes could be made in the above polymers, pharmaceutical compositions, and methods of treatment without departing from the scope of the invention, it is intended that all matter contained in the above description shall be interpreted as illustrative and not in a limiting sense.

The invention claimed is:

1. A process for converting an ester group of a polymer to an acid group comprising:
   forming a reaction mixture being an aqueous suspension and having a substantially oxygen-free atmosphere, the reaction mixture comprising an aqueous strong base solution and a polymer having a pendant ester of an acid group which hydrolyzes to produce a polymer comprising the pendant acid group or a salt thereof and an alcohol.

2. The process of claim 1 wherein the reaction mixture is allowed to react for up to 14 hours.

3. The process of claim 2, wherein the reaction mixture comprises at least 10 kg of a polymer having a pendant ester of an acid group.

4. The process of claim 3 wherein the reaction mixture is allowed to react for up to about 6 hours.

5. The process of claim 4 wherein the reaction mixture has a substantially oxygen-free atmosphere and wherein the oxygen-free atmosphere comprises an inert gas and the inert gas is helium, neon, nitrogen, argon, krypton, xenon, or a combination thereof.

6. The process of claim 5 wherein the temperature of the reaction mixture is about 80° C. to about 85° C.

7. The process of claim 1 wherein the polymer having a pendant ester of an acid group is a hydrophobic polymer.

8. The process of claim 7 wherein the polymer having a pendant ester of an acid group is in a bead form.

9. The process of claim 7 wherein the hydrophobic polymer having a pendant ester of an acid group comprises structural units corresponding to Formulae 1 and 2, Formulae 1 and 3, or Formulae 1, 2, and 3, wherein Formula 1, Formula 2, and Formula 3 are represented by the following structures:

Formula 1

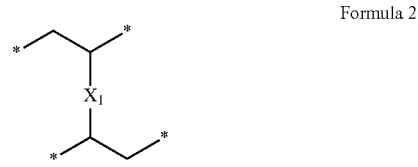

Formula 2

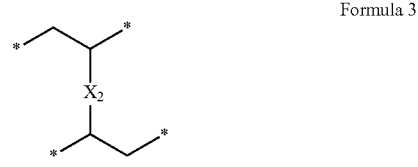

Formula 3 wherein
$R_1$ and $R_2$ are each independently hydrogen, alkyl, cycloalkyl, or aryl;
$A_{31}$ is an ester of a carboxylic, phosphonic, or phosphoric group;
$X_1$ is arylene; and
$X_2$ is alkylene, an ether moiety, or an amide moiety.

10. The process of claim 9 wherein the hydrophobic polymer having a pendant ester of an acid group comprises structural units corresponding to Formulae 1A, 2A, and 3A represented by the following structures:

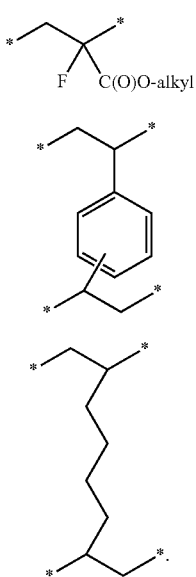

Formula 1A

Formula 2A

Formula 3A

11. The process of claim 7 wherein the hydrophobic polymer having a pendant ester of an acid group comprises a reaction product of a polymerization mixture comprising monomers of either (i) Formulae 11 and 22, (ii) Formulae 11 and 33, or (iii) Formulae 11, 22, and 33, wherein Formula 11, Formula 22, and Formula 33 are represented by the following structures:

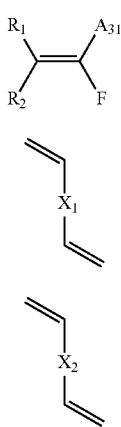

Formula 11

Formula 22

Formula 33 and wherein
$R_1$ and $R_2$ are each independently hydrogen, alkyl, cycloalkyl, or aryl;
$A_{31}$ is an ester of a carboxylic, phosphonic, or phosphoric acid group;
$X_1$ is arylene; and
$X_2$ is alkylene, an ether moiety, or an amide moiety.

12. The process of claim 11 wherein the hydrophobic polymer having a pendant ester of an acid group comprises a reaction product of a polymerization mixture comprising monomers of Formulae 11, 22, and 33 and Formulae 11, 22, and 33 are represented by the following structures:

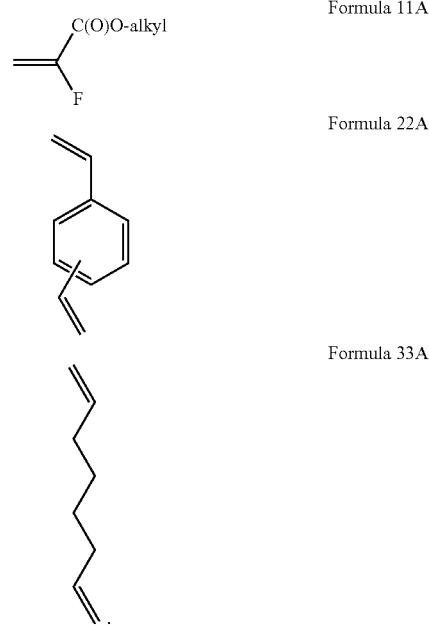

Formula 11A

Formula 22A

Formula 33A

13. The process of claim 11 wherein the alkyl group of the ester is a methyl, ethyl, n-propyl, isopropyl, n-butyl, isobutyl, tert-butyl, sec-butyl, n-pentyl, 2-pentyl, 3-pentyl, 2-methyl-1-butyl, 3-methyl-1-butyl, 3-methyl-2-butyl, 2,2-dimethyl-1-propyl, 1,1-dimethyl-1-propyl, n-hexyl, 2-hexyl, 3-hexyl, 2-methyl-1-pentyl, 2-methyl-2-pentyl, 2-methyl-3-pentyl, 3-methyl-1-pentyl, 3-methyl-2-pentyl, 3-methyl-3-pentyl, 4-methyl-1-pentyl, 4-methyl-2-pentyl, 2,2-dimethyl-1-butyl, 2,3-dimethyl-1-butyl, 3,3-dimethyl-1-butyl, 3,3-dimethyl-2-butyl, 2,3-dimethyl-2-butyl, or 2-ethyl-1-butyl ester.

14. The process of claim 11 wherein the molar ratio of the strong base to the monomer of formula 11 is from about 0.8 to about 1.5.

15. The process of claim 7 wherein the hydrophobic polymer having a pendant ester of an acid group comprises a methyl ester of poly-α-fluoroacrylic acid, the methyl ester of poly-α-fluoroacrylic acid is crosslinked with a crosslinking monomer, and the crosslinking monomer is divinyl benzene, 1,7-octadiene, or a combination thereof.

16. The process of claim 1 wherein the polymer having a pendant ester of an acid group is crosslinked.

17. The process of claim 1 wherein the polymer content of an aqueous suspension of the polymer having a pendant ester of an acid group added to the reaction mixture is about 15 wt. % to about 30 wt. %.

18. The process of claim 1 wherein the alcohol is methanol, ethanol, propanol, or a combination thereof.

19. The process of claim 1 wherein the reaction mixture comprises from about 5 wt. % to about 15 wt. % alcohol.

* * * * *